(12) United States Patent
King et al.

(10) Patent No.: US 8,429,423 B1
(45) Date of Patent: Apr. 23, 2013

(54) TRUSTED PLATFORM MODULES

(75) Inventors: James E. King, Wokingham (GB); Rhod J. Jones, Crowthorne (GB)

(73) Assignee: Oracle America, Inc., Redwood City, CA (US)

( * ) Notice: Subject to any disclaimer, the term of this patent is extended or adjusted under 35 U.S.C. 154(b) by 2591 days.

(21) Appl. No.: 10/865,288

(22) Filed: Jun. 10, 2004

(51) Int. Cl.
*G06F 11/30* (2006.01)

(52) U.S. Cl.
USPC .......................................................... 713/193

(58) Field of Classification Search .................... 713/193
See application file for complete search history.

(56) References Cited

U.S. PATENT DOCUMENTS

| | | | | |
|---|---|---|---|---|
| 4,837,677 A | * | 6/1989 | Burrus et al. ................. | 710/308 |
| 5,923,884 A | * | 7/1999 | Peyret et al. ................. | 717/167 |
| 7,216,369 B2 | | 5/2007 | Wiseman et al. | |
| 2003/0097558 A1 | * | 5/2003 | England et al. ................ | 713/155 |
| 2004/0125959 A1 | * | 7/2004 | Beuque et al. ................. | 380/279 |
| 2006/0005000 A1 | | 1/2006 | King et al. | |
| 2006/0129848 A1 | * | 6/2006 | Paksoy et al. ................. | 713/193 |

OTHER PUBLICATIONS

U.S. Appl. No. 60/561,135, filed Apr. 2004, Paksoy et al.*
Trusted Computing Platform Alliance, "TCG PC Specific Implementation Specification," Version 1.0, Sep. 9, 2001.

* cited by examiner

*Primary Examiner* — Cordelia Zecher

(74) *Attorney, Agent, or Firm* — Meyertons Hood Kivlin Kowert & Goetzel, P.C.; Jeffrey C. Hood

(57) ABSTRACT

A method of porting of trust data includes a computer system extracting trust data from the trust module using a manufacturer key. The trust data and the manufacturer key are then stored, encrypted with a control key, on a removable storage medium.

22 Claims, 13 Drawing Sheets

TRUSTED PLATFORM MODULES

BACKGROUND OF THE INVENTION

The present invention relates to computer systems, and to securing the integrity of computer systems.

The trusted computing group has developed guidelines for remote application attestation to confirm that an application is to be trusted. This involves the use of a trust module (termed a trusted platform module) that holds trust data including private keys to the system and measurements of the software applications to confirm their validity. The measurements include generating a hash of firmware or software as appropriate. Included in this trust data is also platform relating to a software stack and a core root of trust measurement relating to firmware that initiates the computer system hardware and possible other layers of firmware prior to loading of the operating system. This data is platform specific. The trust data is secured in the trust module using a manufacturer key.

The present invention addresses the technical problem of porting such data to a replacement system, in the event, for example, of the failure of a computer system.

SUMMARY OF THE INVENTION

An aspect of the invention provides a method of enabling the porting of trust data secured in a trust module of a computer system using a manufacturer key. The method includes the computer system extracting the trust data from the trust module using the manufacturer key. The trust data and the manufacturer key are then stored, encrypted with a control key, on a removable storage medium.

The manufacturer key enables the extraction of the trust data from the trust module. The encoding of the trust data and the manufacturer key using the control key enables the trust data and manufacturer key to be held in a secure manner on the removable storage medium. The removable storage medium can then be used to transfer the trust data and the manufacturer key to a replacement system in the event of the failure of the computer system.

In an example embodiment of the invention, a system controller of the computer system is operable to extract the trust data from the trust module and to store the trust data and the manufacturer key encrypted with a control key on the removable storage medium. In an example embodiment of the invention, to keep the trust data held on the removable storage medium current, the trust module can be monitored for changes, and in the event of detecting a change, the extracting of the trust data from the trust module and the storing of the updated trust data encrypted with the control key can be repeated.

In the event of the failure of the computer system, the removable storage medium can be removed from the computer system and provided to a replacement computer system. The replacement computer system, which is preprogrammed with the control key, can be operable to extract the trust data and the manufacturer key from the removable storage medium using the control key and to program a trust module of the replacement computer system using the trust data encrypted using the manufacturer key.

Another aspect of the invention provides a computer system comprising a trust module, in which trust data is secured using a manufacturer key. The computer system can be operable to extract the trust data from the trust module using the manufacturer key and to store the trust data and the manufacturer key, encrypted with a control key, on a removable storage medium.

A further aspect of the invention provides a system configuration card for a computer system, the system configuration card carrying trust data and a manufacturer key useable by a trust module for encrypting the trust data, the trust data and the manufacturer key carried by the system configuration card being encrypted by a control key.

BRIEF DESCRIPTION OF THE DRAWINGS

Embodiments of the present invention will be described hereinafter, by way of example only, with reference to the accompanying drawings in which like reference signs relate to like elements and in which.

Figure 1:
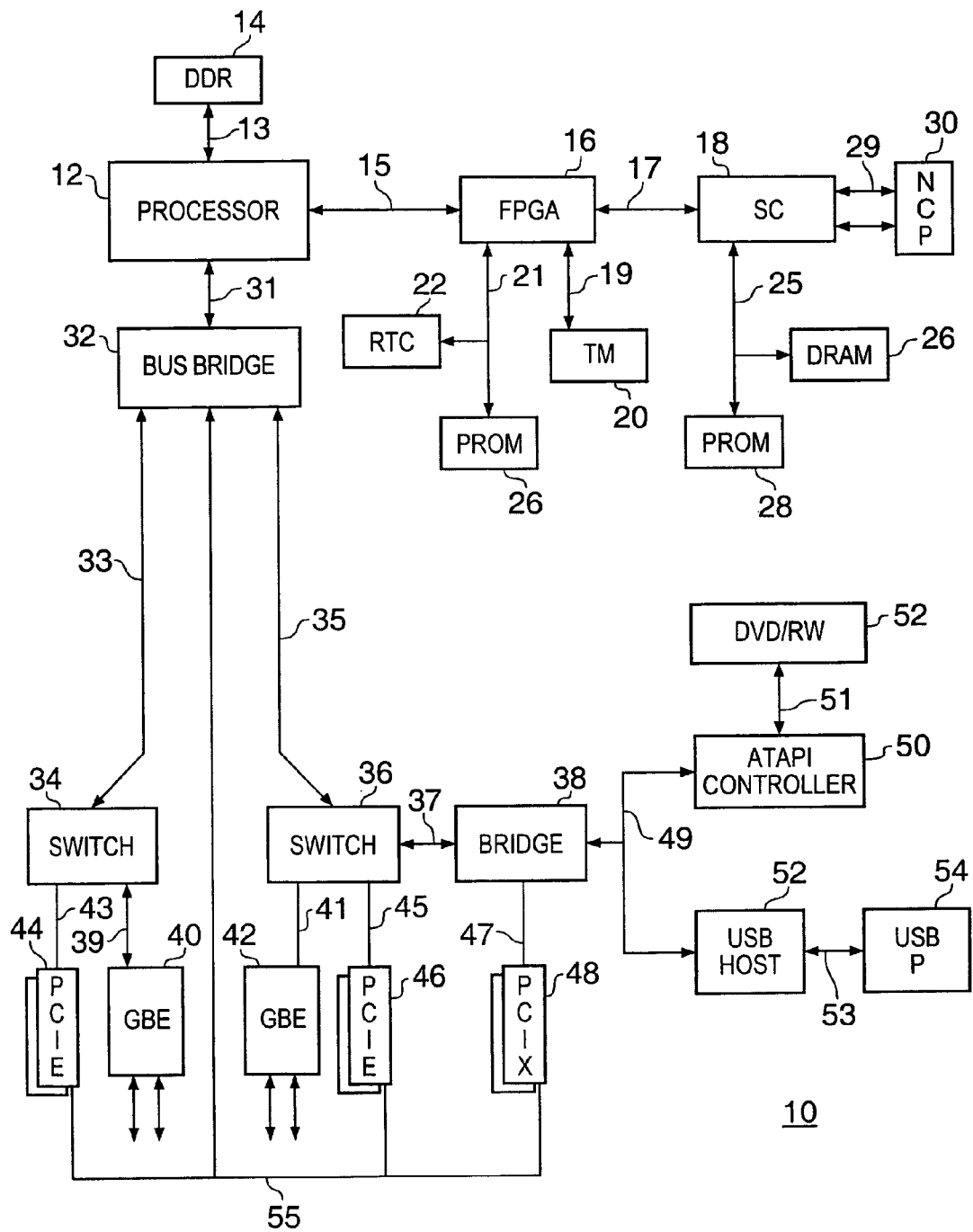
FIG. 1 is a schematic block diagram of an example of an embodiment of a computer system in accordance with the present invention.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims. In this regard, combinations of features from the independent claims with features of dependent claims other than as presented by the dependencies of the claims, and also with features from the description, are envisaged.

DESCRIPTION OF PARTICULAR EMBODIMENTS

Embodiments and examples are described hereafter by way of example only in the following with reference to the accompanying drawings.

In the following, examples of operation of a system employing the use of trusted platform data will be described.

The trusted computing group (TCG) have created a trust module called a trusted platform module (TPM), which forms a "root of trust" for a system, and stores all of the security keys for that system. The TPM resides in a computer, and provides encrypted hash measurements and connection authentication data to validate that software used on the systems and connections made with the system are trustworthy.

FIG. 1 is a schematic block diagram of an example of a computer system in which the present invention may be implemented.

As illustrated in FIG. 1, the computer system 10 includes a processor 12, which is connected via one or more memory buses 13 to memory 14, in the present instance DDR memory. The processor 12 is also connected via a bus to a FPGA 16, which provides various control operations in association with the processor 12. The field programmable data array (FPGA) has access to a real-time clock 22 and a programmable read only memory 24 via a bus 21. The FPGA also has access to a trust module 20 via a bus 19. The FPGA is connected to a system controller 18 via a further bus 17. The system controller 18 has responsibilities for monitoring the operation of the processor, and for providing various control functions. The system controller has access to a programmable read only memory 28 and random access memory (e.g. dynamic random access memory (DRAM)) 26 via a bus 25. The system controller 18 also has access to network and console ports 30 via further buses 29.

The processor 12 is connected via an I/O bus 31 to a bus bridge 32. The bus bridge 32 is connected to various buses, in the present instance buses 33 and 35, which can be configured as peripheral computer interface (PCI) buses.

The bus 33 is connected to a switch 34, which in turn is connected to one or more PCI buses 33. PCI cards (in the present instance PCI-E cards 44) can be connected to the PCI bus(es) 43. The switch 34 is also connected to a further bus 39, to which a network interface 40 (in the present instance a dual Gigabyte Ethernet interface). Similarly, the bus 35 is connected to a switch 36. The switch 36 is connected to a PCI bus 45, to which one or more PCI cards 46 (in the present instance PCI-E cards) are connected. The switch 36 is also connected to a further bus 41 to which a network interface 42 (in the present case a dual Gigabyte Ethernet interface) is connected.

A further bus 37 connects the switch 36 to a PCI-X bridge 38. Connected to the bridge 38 is a PCI-X bus 47 to which one or more PCI-X cards 48 can be connected. The bridge 38 is further connected to a bus 50 to which a storage controller 50 is connected for supporting a connection 51 to, for example, a DVD read/writer 52. Also connected to the bus 50 is a USB host 52, to which one or more USB ports 54 are connected via a connection 53.

Figure 2:
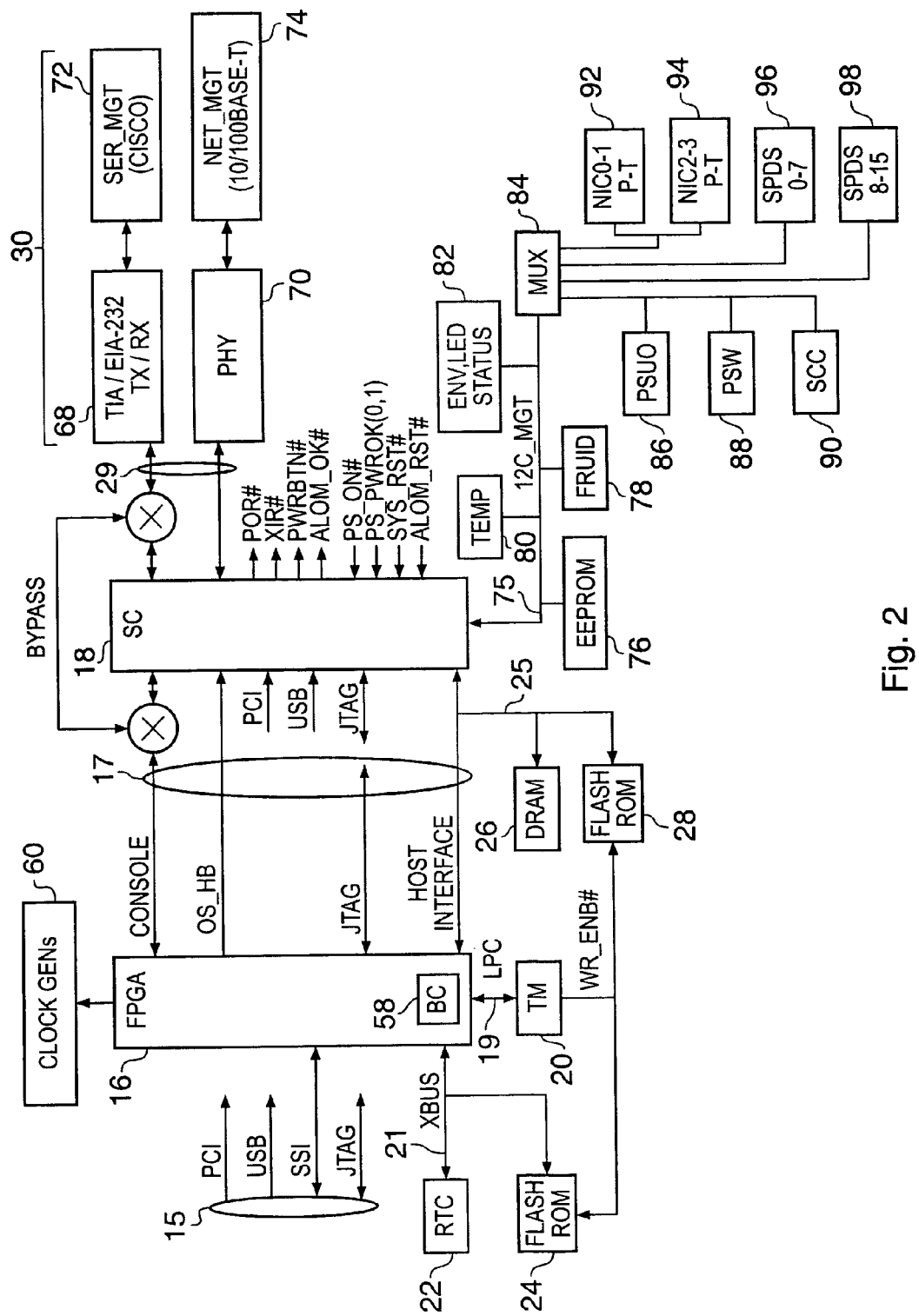
FIG. 2 is a schematic block diagram, showing in more detail, part of the computer system of FIG. 1.

FIG. 2 illustrates part of the system of FIG. 1 in more detail. In particular, FIG. 2 illustrates the top right of the system in FIG. 1, to the right of the bus 15. It will be noted that a serial connection from the bus 15 is connected to the FPGA 16. The FPGA 16 includes a bus controller 58 which acts as a bus master for the low pin count (LPC) bus 19 to which the trust module 20 is connected. Also connected to the FPGA is an Xbus 21 to which the real-time clock 22 and the flash ROM 24 are connected. Also connected to the FPGA 16 is a clock generator 60. Various connections are provided between the FPGA 16 and the system controller 18 via the bus structure 17. This includes a console interface, an operating system heartbeat (O/S_HB) connection, a JTAG connection and a host interface connection. Connected to the host interface connection is a bus structure 25 to which the DRAM 26 and the flash ROM 28 are connected. The bus structure 29 provides connections between the system controller 18 and an interface 68 for a serial management connection 72. Also provided by the bus connection 29 is a physical interface 70 to a network management interface 74. The serial management connection 72 and the network management connection 74 together form the console and network port 30 illustrated in FIG. 1.

FIG. 2 also illustrates a number of components connected to an I2C bus 75. These include an EEPROM 76 and a chip 78, which contains a field replaceable unit identity (FRUID) for the system controller 18. Also connected to the I2C bus are temperature sensors and environmental sensors 80 and 82. A multiplexer 84 is also connected to the I2C bus 75. The multiplexer 84 in turn provides connections to first and second power supply units 86 and 88, and to a system configuration card (SCC) receiver 90 for receiving a system configuration card which forms a removable storage device for storing system configuration data. As will be described in the following, the system configuration card is also used to store trust data and a management key for use in provided trusted services within the computer system 10. Also connected to the multiplexer 84 are serial presence detect (SPD) connections 96 and 98 for the memory 14. The network interface cards 40 and 42 shown in FIG. 1 are also connected to the multiplexer 84.

Figure 3:
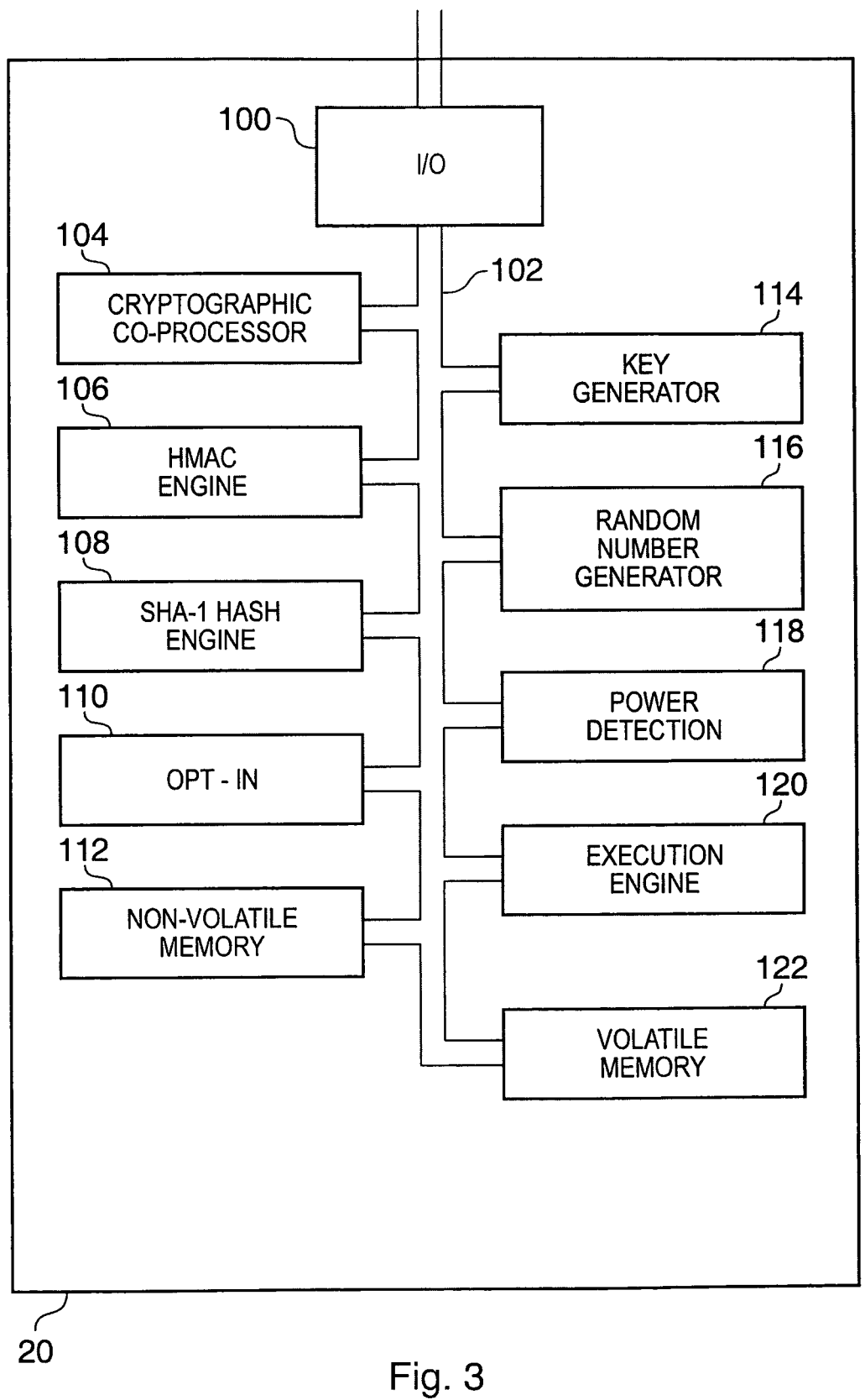
FIG. 3 illustrates an example of a trust module for use in the computer system of FIG. 1.

FIG. 3 illustrates an example of the configuration of a trust module in accordance with the trusted platform module architecture as proposed by the TCG.

As illustrated in FIG. 3, the trust module 20 includes an I/O interface 100 for connection to the LPC bus 19 illustrated in FIG. 2. The I/O interface 100 provides a connection to an internal bus 102. The I/O interface 100 manages information flow over the communication bus 102. It performs protocol encoding/decoding for communication over the external LPC bus 19 and routes messages to appropriate components. A number of further components are connected to the internal communication bus 102.

A cryptographic co-processor 104 implements cryptographic operations within the trust module. The trust module employs conventional cryptographic operations in conventional ways. Those operations include asymmetric key generation, asymmetric encryption/decryption, hashing, and random number generation. The trusted module uses these capabilities to perform the generation of random data, the generation of asymmetric keys, signing and providing the confidentiality of stored data.

A HMAC engine 106 provides proof of knowledge of authorisation data, and proof of the request arriving as authorised and has no modifications made to the commands in transit.

A SHA-1 hash engine 108 provides hash capability for use by the trust engine. It provides a trusted implementation of a hash algorithm.

An OPT-IN component 110 provides mechanisms and protection to allow the trust module to be turned on and off, enabled and disabled, activated and deactivated. The OPT-IN component 110 maintains the state of persistent and volatile flags and enforces semantics associated with those flags.

Non-volatile memory 112 is used to store trust data, which comprises persistent identity and status associated with the trust module.

A key generator 114 creates key pairs and symmetric keys.

A random number generator 116 provides a source of randomness in the trust module. The random number generator consists of a state machine that accepts and mixes unpredictable data and a post-processor that has a one way function.

A power detection component 118 manages the trust module power states in conjunction with platform power states. The power detection component also supports physical presence assertions.

An execution engine 120 runs program code to execute trust module commands received from the I/O interface 100.

Volatile memory 122 provides working space for operation components.

A platform configuration register (PCR) provides a 160-bit storage location for discrete integrity measurements. There are a number of, for example 16 or more, PCRs. The PCRs are provided as shielded-locations inside the trust module, for example within the volatile memory 122. A PCR is designed to hold an unlimited number of measurements in the register, by using a cryptographic hash and hashing all updates to a PCR.

The semantics of platform ownership are tied to a route-of-trust-for-storage (RTS). A wide range of objects can use authorisation data. This is used to establish platform ownership, key use restrictions, object migration and to apply access control to opaque objects protected by the trust module. Authorisation data for trust module controlled objects can be stored in shielded locations, for example within the volatile memory 122.

At initialisation, the trust module will transfer from a power-off state to an initialisation process. A trust module performs a number of self-tests. The trust module is not fully operational until all of the self-tests are completed. After initialisation, the trust module performs a limited self-test. A complete self-test can then be performed.

The trust module is currently designed to be fixed within a computer to which it pertains, and is used to verify the operation of that computer. In, for example, the example of a server system where a server system fails, in order to be able to replace the server, it would be necessary to build up the trust base once more using manual configuration of applications and the trust module. However, in an environment where it may be desired to replace a server, for example where the server fails, it would be desirable to transfer the current state of one trust module to a trust module of a replacement system, whereby the rapid replacement of the server with an identical configuration to the failed server, can be achieved as quickly as possible. Accordingly, and in an example to be described hereinafter, use is made of a system configuration card (SCC) as a portable and removable storage medium, in which the state of a trust module can be stored in a manner which is secure, and would enable the porting of the trust module state of a failed computer to a trust module of a replacement computer.

Figure 4:
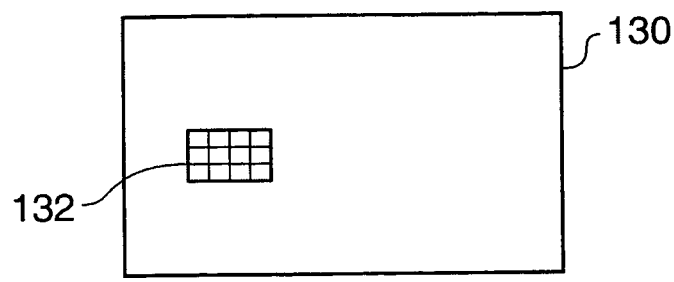
FIG. 4 is a schematic representation of a system configuration card for forming a removable storage medium for use with the computer system of FIG. 1.

FIG. 4 is a schematic representation of a system configuration card 130. As illustrated in FIG. 4, the system configuration card 130 includes a number of contacts 132. The system configuration card 130 can be configured to have the dimensions and format of a standard smart card.

Figure 5:
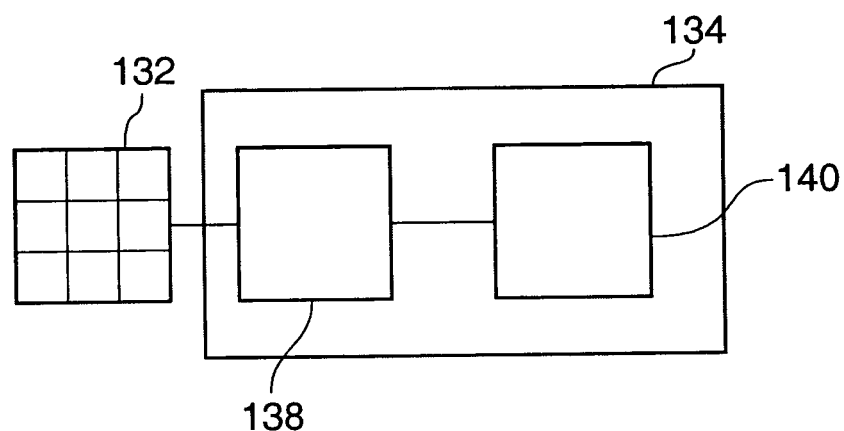
FIG. 5 is a schematic block diagram illustrating logical components of the system configuration card of FIG. 4.

FIG. 5 illustrates an integrated circuit 134 that is configured below the contacts 132. The integrated circuit 134 includes an interface controller 138 that is connected to the contacts 132, and also to a memory 140.

Figure 6:
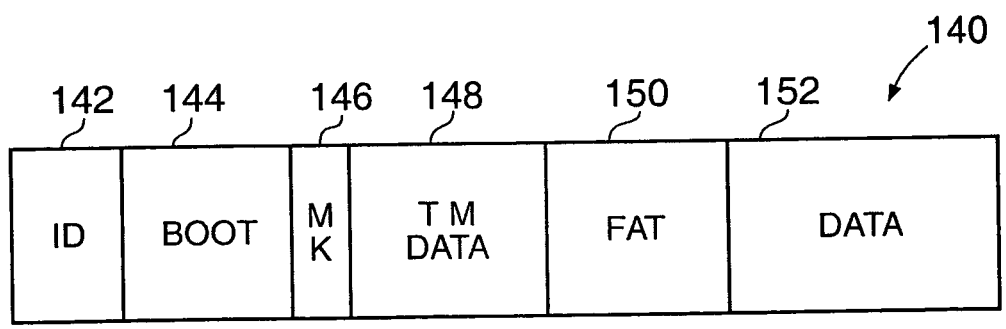
FIG. 6 illustrates the content of a memory of the system configuration card of FIG. 4.

FIG. 6 illustrates an example of the contents of the memory 140 in an example of a system configuration card. The memory 140 can be configured in a conventional manner as for any drive to be connected to a computer system. As illustrated in 140, the memory is configured in the present example to include an identity field 142, a field 144 for boot information used in configuration of the computer system for which the card is intended, an area 146 for containing a manufacturer key for use with the trusted module 20 of that computer system, an area 148 for receiving trusted module data, address tables (FAT) 150 and storage for data 152. As will be described in the following, the manufacturer key 146 and the trust module data 148 are encrypted using a control key that is held by the system controller of the computer system.

Figure 7:
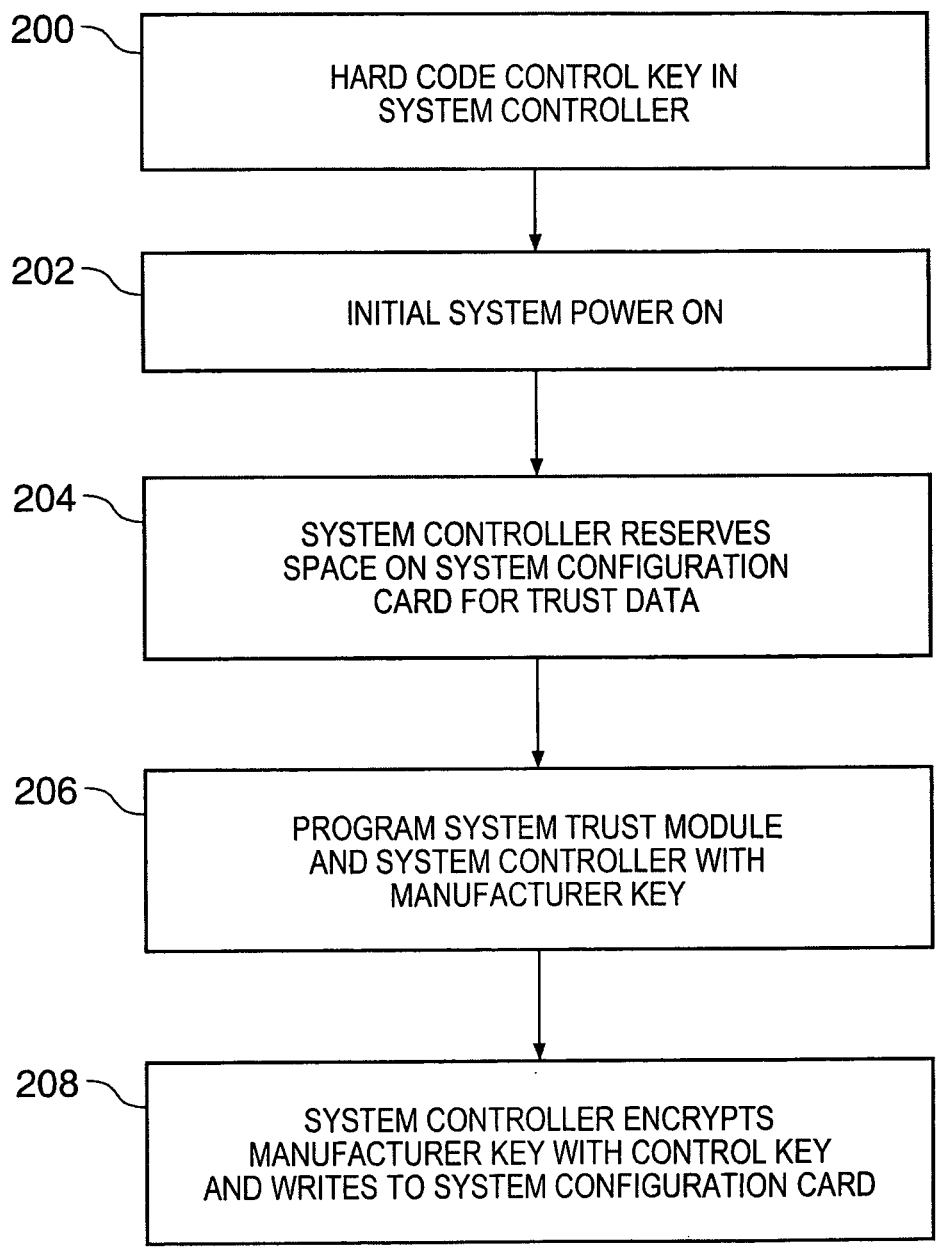
FIG. 7 illustrates steps of part of a method of porting trust data.

FIG. 7 illustrates an example of the operation of an embodiment of the invention for initial configuration. In step 200, the control key (system controller key) is hard coded into the system controller. In step 202, the computer system 10 is powered on for the first time. In step 204, the system controller reserves space on the system configuration card for the trust data (i.e., the areas 146 and 148 are reserved in the system configuration card by the system controller). In step 206, the system trust module 20 and the system controller 18 are programmed with a manufacturer key. The manufacturer key is a key that can be programmed into a trusted module to allow subsequent access to the trusted module data. It can also be used to encrypt the trusted module data when it is exported such that the data is never exported in its raw format. Once a trusted module has been unlocked with a manufacturer key, the interface to it includes functions to read out the entire trusted data, program in the entire trusted data and program in a new manufacturer key. If a trusted module is not initially programmed with a manufacturer key or it is currently locked with respect to that key, those functions are not available. In step 208, the system controller encrypts the manufacturer key with the control key and writes the encrypted manufacturer key to the space 146 allocated therefor on the system configuration card 130.

The control key is a key that can be initially allocated to a single system or a set of systems by the manufacturer. The control key can, however, optionally be changed by a customer.

Figure 8:
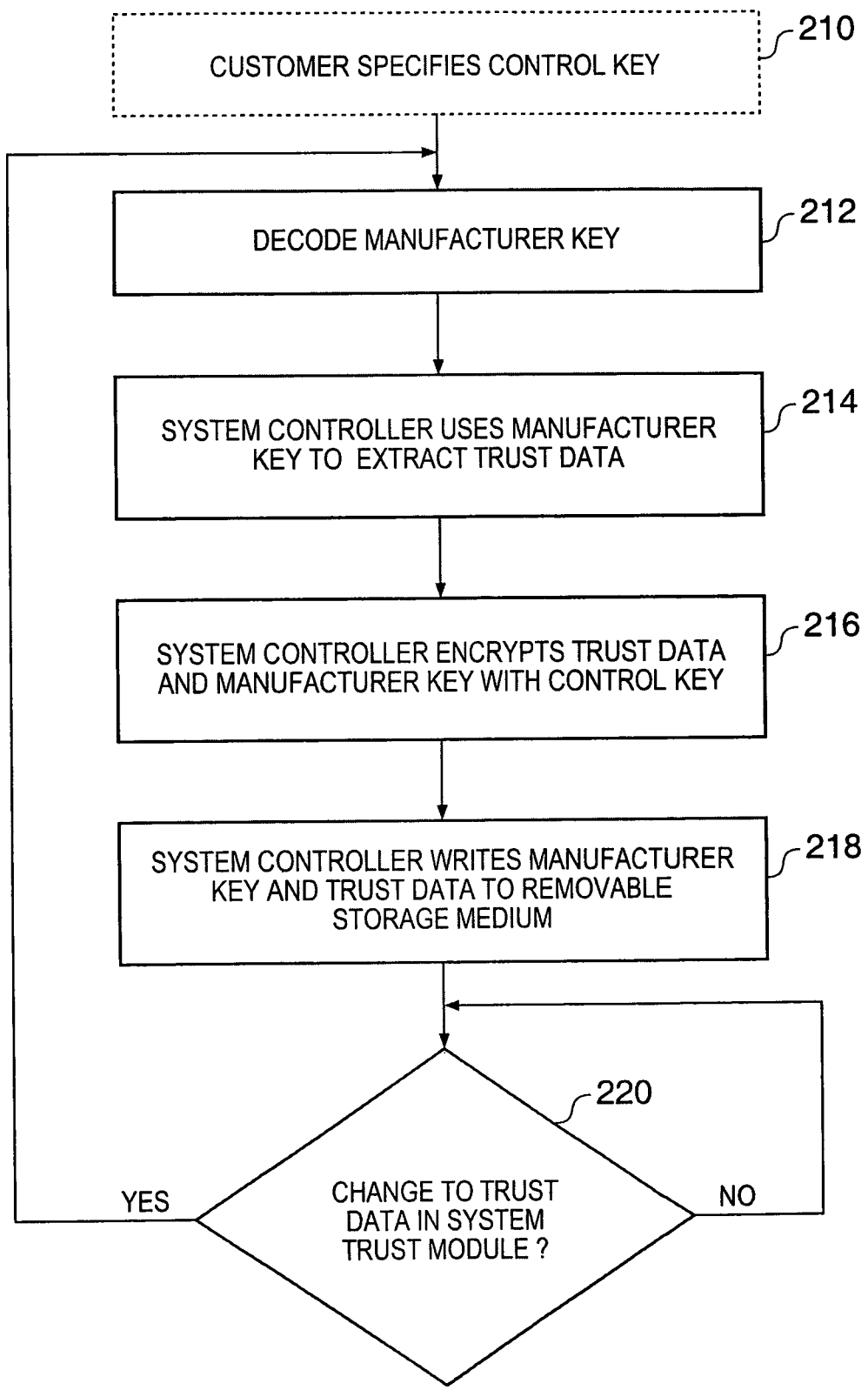
FIG. 8 illustrates further steps of an example of a method of porting trust data.

FIG. 8 illustrates subsequent operation of the computer system following initial manufacture.

Accordingly, as indicated above, in step 210, a customer can optionally specify a new control key.

In step 212, the system controller is operable to decode the manufacturer key.

In step 214, the system controller uses the manufacturer key to extract trust data from the storage of the trust module 20.

In step 216, the system controller is operable to encrypt the trust data with the control key. In step 218, the system controller is operable to write the manufacturer key and the trust data to the removable storage medium (in the present case, the system configuration card 130) to the space allocated therefor 148 in the memory 140 of the system configuration card 130.

In step 220, the system controller is operable to determine whether the trust data in the system trust module has changed. If the data in the system trust module has not changed, then this step is repeated. Alternatively, if the trust data has changed, then control passes back to step 212.

In order to carry out the steps shown in FIG. 8, the system controller 18 requires access to the trust module 20. Accordingly, as the bus 19 is shared with the processor, the system controller is operable to carry out the steps of the process illustrated in FIG. 8 during a time when the processor does not have access to the bus 19. This can be provided, for example, at initiation of the computer system 10, during the initial boot phase. Alternatively, it can also be achieved during a reset operation of a computer system. However, if it is required that the trust data stored in the system configuration card is updated at more regular intervals, or more particularly in response to a change in the trust data in the trust module 20, then the bus controller 58 can be operable during normal operation of the computer system to identify access by the processor 12 to the trust module 20. In the event of detecting access to the trust module 20, the bus controller 58 can be operable to notify the system controller 18 that this has occurred. The system controller 18 can then be operable, after a delay to enable the access to the trust module by the processor 12 to be completed, to request the bus controller to grant it sole access to the bus 19. In response to being granted sole access to the bus 19, the system controller 18 can be operable to perform step 220 and in the event of detecting a change to the trust data, can be operable to perform the steps 212-218 once more before passing control back to the processor.

By means of the process described with reference to FIGS. 7 and 8, it can be seen that it is possible to hold a copy of the manufacturer key and the trust data from the trust module on a system configuration card. The data held on the system configuration card can be kept current by monitoring for changes to the trust data in the system trust module as described above. Accordingly, in the event that the computer system fails, a record of the trust data is held on the system configuration card and could be transferred to a replacement system. As the manufacturer key and the trust data is held on the system configuration card encrypted using the control key, the manufacturer key and the trust data is held in a secure manner on the system configuration card.

Figure 9:
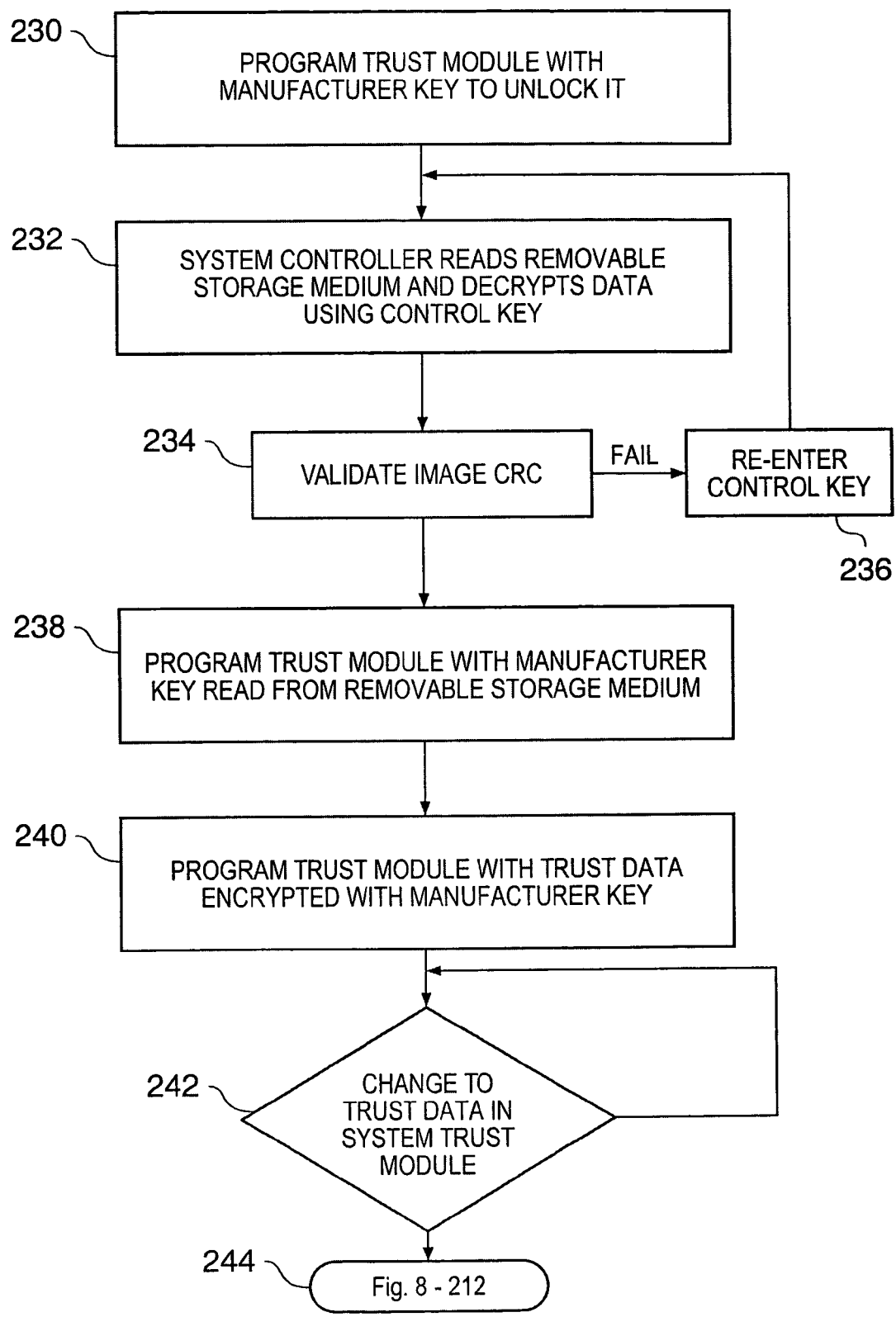
FIG. 9 illustrates further steps in an example of a method of porting trust data.

FIG. 9 illustrates a process whereby a system configuration card, which has been removed from the failed system, can be used to configure a replacement system with the same trusted module status as that of the failed system. This process is performed before initialization of the host of the replacement system, i.e. before the operation system is initiated, whereby the service controller has full control of the bus 19 to which the trust module 20 is attached. In step 230, the trust module of the replacement system is programmed with its manufacturer key by the service controller 18 to enable the service controller to write the new manufacturer key and the trust data read from the removable storage medium. In step 232, the system controller of the replacement computer system reads the removable storage medium (in the present instance the system configuration card 130) which has been transferred from the failed system to the replacement system, and decrypts the data using the control key. In step 234, the image generated thereby is validated using a cyclic redundancy check code (CRC). In the event that this check fails, it is probable that the control key that was used was incorrect. In this case, the customer is invited at step 236 to re-enter the control key, and step 232 is repeated. Assuming that the validation in step 234 is positive, then in step 238, the trust module of the replacement system is programmed with the manufacturer key extracted from the removable storage medium using the control key.

In step 240, the trust module is programmed with the trust data that had been extracted from the removable storage medium using the control key. In programming the trust module, the trust data is encrypted with the manufacturer key. At this stage, the status of the trust module of the replacement system should correspond to that of the trust module of the failed system at the last time that the removable storage medium (system configuration card) had been updated prior to failure of the failed system, and the host of the new or replacement system can now be initialised. Accordingly, as for step 220 of FIG. 8, the next stage is to test for any change in the trust data of the system trust module. In the event of detecting a change, in the same manner as described above with reference to FIG. 8, control passes back to step 212 of FIG. 8, whereby the operation of the steps 212-220 can be performed once more, this time for the replacement computer system, as opposed to the original, failed, computer system.

Accordingly, there has been described a method and apparatus, whereby the status of a trust module from a failed system, can reliably and securely be transferred to the trust module of a replacement system, without requiring complete manual reprogramming of the replacement system.

The manufacturer key is primarily just a code used to unlock some administrative functions. The additional usage of the manufacturer key to encrypt the exported trust data enables protection profile requirements disallowing unencrypted trust data over snoopable hardware to be met. This feature also means that the service controller never needs to de-encrypt the trust data to its raw form even in its memory. It receives the trust data encrypted with manufacturer key and encrypts it further to write out to removable storage medium. Then in a new or replacement system it writes in the manufacturer key to the trust module of the new or replacement system before the trust data such that the trust module of that new or replacement system expects to receive the data encrypted with the manufacturer key. If it were not for this mechanism, the service controller would need to de-encrypt the trust data completely in order to pass it to the trust module of a new or replacement system such that it could understand it.

In the system described above, it is assumed that the number of trust module operations and the number of attestations required in respect of trust processing, can be handled by a standard trust module. In this regard, it is to be noted that conventional trust modules have a relatively low processing capacity, being built around simple process structures, and being available at very low cost, of the order of one or a few dollars per unit. However, in applications where large numbers of operations may be performed (for example, in the context of computer servers used for commercial transactions), the capacity of a conventional trust module may be insufficient. Accordingly, there will now be described an example embodiment of the invention with reference to FIG. 10, in which a trust subsystem 300 is provided. In the present example, the trust subsystem 300 can be configured as a PCI (PCI-E or PCI-X) card, which can be provided as one of the PCI cards 44, 46 or 48 illustrated in FIG. 1. Although in the present example, the trust subsystem 300 could be implemented using another card format or indeed could be integrated onto the motherboard of the computer system. Accordingly, in the present example, it is assumed that the system trust module 20 is provided on the motherboard of to the computer system 10 with the trust subsystem 300 being implemented as a PCI card 44, 46 or 48 connected to an appropriate one of the PCI buses 43, 45 or 47 as well as the I2C bus 55 shown in FIG. 1.

Figure 10:
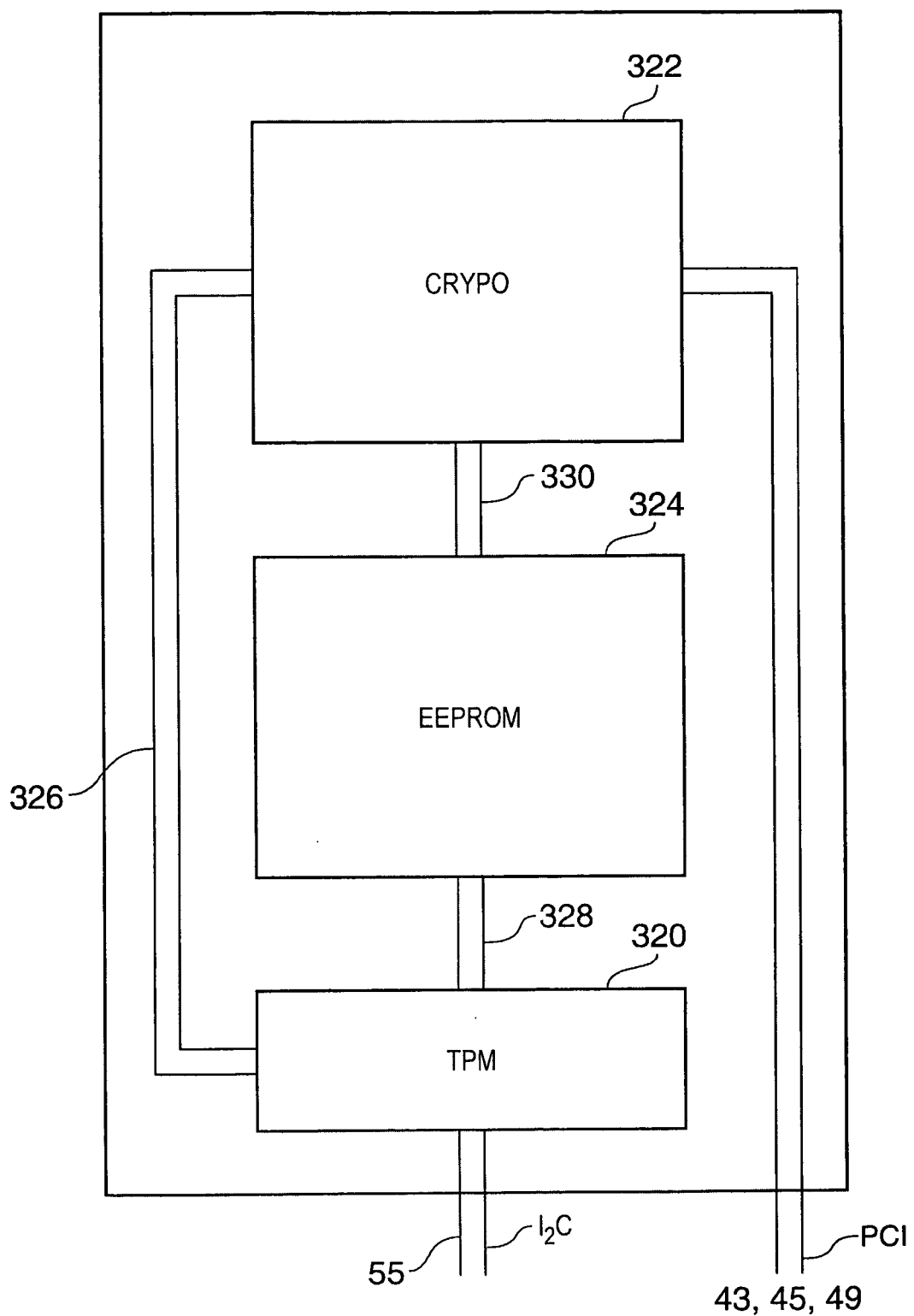
FIG. 10 illustrates an example of a trust subsystem.

As illustrated in FIG. 10, the trust subsystem is based on a standard trust module 320, which corresponds generally to the system trust module 20 of FIG. 1. The subsystem trust module 320 is connected to the I2C bus 55 of FIG. 1. The subsystem also includes a performance engine 322 that can perform cryptographic functions, hashing functions and random number generation. The performance engine 322 is provided with special purpose circuitry for carrying out these functions. The performance engine can be a standard special purpose cryptographic engine, for example in the form of an Application Specific Integrated Circuit (ASIC) that can be used within the computer system 10 for carrying out such functions. For this purpose, the performance engine is connected to the PCI bus 43, 45 or 47 for the PCI card 44, 46 or 48 on which the trust subsystem is implemented. Although in the present instance, the cryptographic, hashing and random number functions are integrated in a single performance engine circuit, one or more of these functions could be provided by a separate circuit. The subsystem trust module 320 is also connected to the performance engine 322 by a private bus 326.

The subsystem trust module 320 and the performance engine 322 each have access, via 328 and 330, respectively, to memory (preferably non-volatile memory such as a EEPROM 324), for the storage of trust and other data. The memory 330 enables the storage of data where a significant number of validation measures are employed. In the event of the computer system failing, the trust subsystem 300 can be removed from a failed computer system 10 and inserted into a replacement computer system 10 with its data intact in the memory 324.

In order to meet the protection profile for a trust module, the trust subsystem 300 of FIG. 10 as a whole needs to be secure. For example, if the trust subsystem were to write keys, hashes, etc to the EEPROM 330 as raw data that could be accessed by snooping some pins or PCB tracks, this would not meet the trust requirements. The trust subsystem 300 is therefore set up with all the appropriate trusted data encrypted in the shared memory 330.

The private bus 326 (e.g. a PCI bus) between the subsystem trust module 320 and the performance engine 322 can be used to route commands to the performance engine as they arrived at the subsystem trust module. The performance engine 322 can quickly read the data back from the EEPROM 324, de-encrypt it (keeping some results cached internally for better performance next time), use it to perform the command and then return the result to the subsystem trust module 320 such that the only data passing between devices in 300 is that which would pass over the external I2C bus 55. The shared EEPROM encryption is done with a private key, which is fixed at manufacture. The writes to the shared EEPROM 324 are slow, but then these are rare and do not constitute a performance issue, but the commands to take some data and encrypt it with an existing EEPROM key or to hash some data are much faster thanks to the use of the performance engine 322.

The trust operations can be implemented in various ways depending on a desired implementation. The following discussion of various terms will be useful in understanding the various modes of operation.

An integrity measurement is the measurement of a piece of software or a portion of data taken using a hashing function to provide a 160 bit hash value. The association between an object to be measured and the measure (i.e. the calculated hash value) can be considered unique. The measurement can be described as an integrity measurement because this unique value can be used to check that an object has not been modified since a reference measurement.

A secure boot provides a mechanism that uses an integrity measurement to certify that software that is running on a system, from the first code that takes control after a system reset (core root of trust for measurement) up to the operating system.

A core root of trust for management provides a first code that takes control of a system after a reset (soft or hard). A requirement of this code is that it is immutable. Immutability is a characteristic of a piece of code that can only be changed using a manufacturer approved process. The core root of trust for management is to be trusted as a route of a chain of trust leading up to an operating system, drivers and applications. That forms a means through which a core root of trust for measurement can be trusted.

Two examples of operation for validating integrity will now be described. In a first example, a system trust module is programmed by the correct measurements by a system administrator (who invokes a command which tells the trust module that the current measures are those which should always be found) and the system trust module simply compares the measures as it gets them against the expected values. If the compare succeeds, the system trust module remains unlocked. If the compare fails the system trust module becomes locked until a next system reset or an administrator resets the system trust module. In the second example, no expected values are programmed into the system trust module. The software measures are passed to the system trust module before that bit of code is loaded as before, but are now just available to be interrogated by a remote entity wanting to check the system integrity.

In the first example of operation, each software component involved in a boot process performs an integrity measure of the next software component that will take control of the system. The integrity measure is stored in a register of a trust module. Having access to a set of reference values, the trust module checks that the integrity measure taken is the same as the reference value for the component being measured. In this way, each software module has control over possible software tampering. This model is described as "secure boot".

Figure 11:
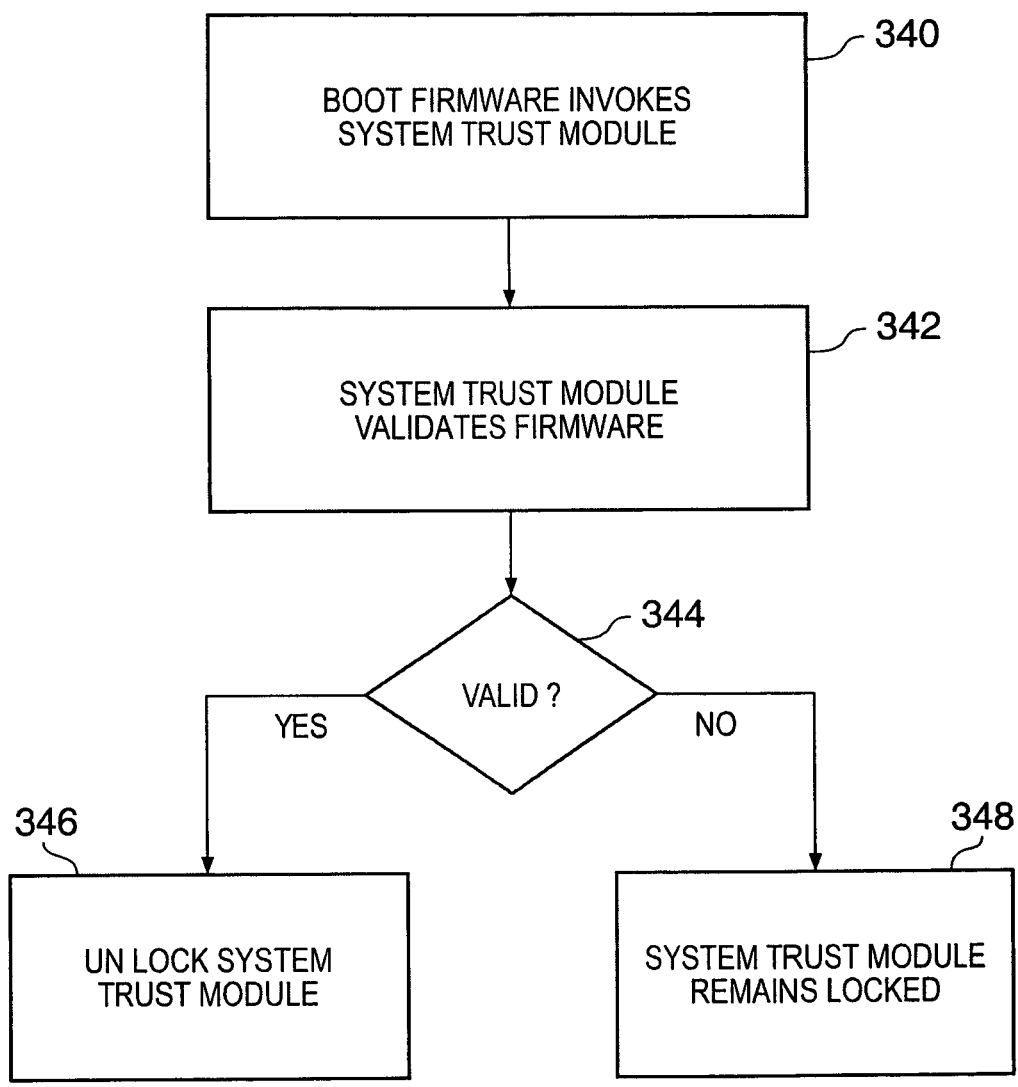
FIG. 11 illustrates steps of validating firmware using a system trust module.
Figure 12:
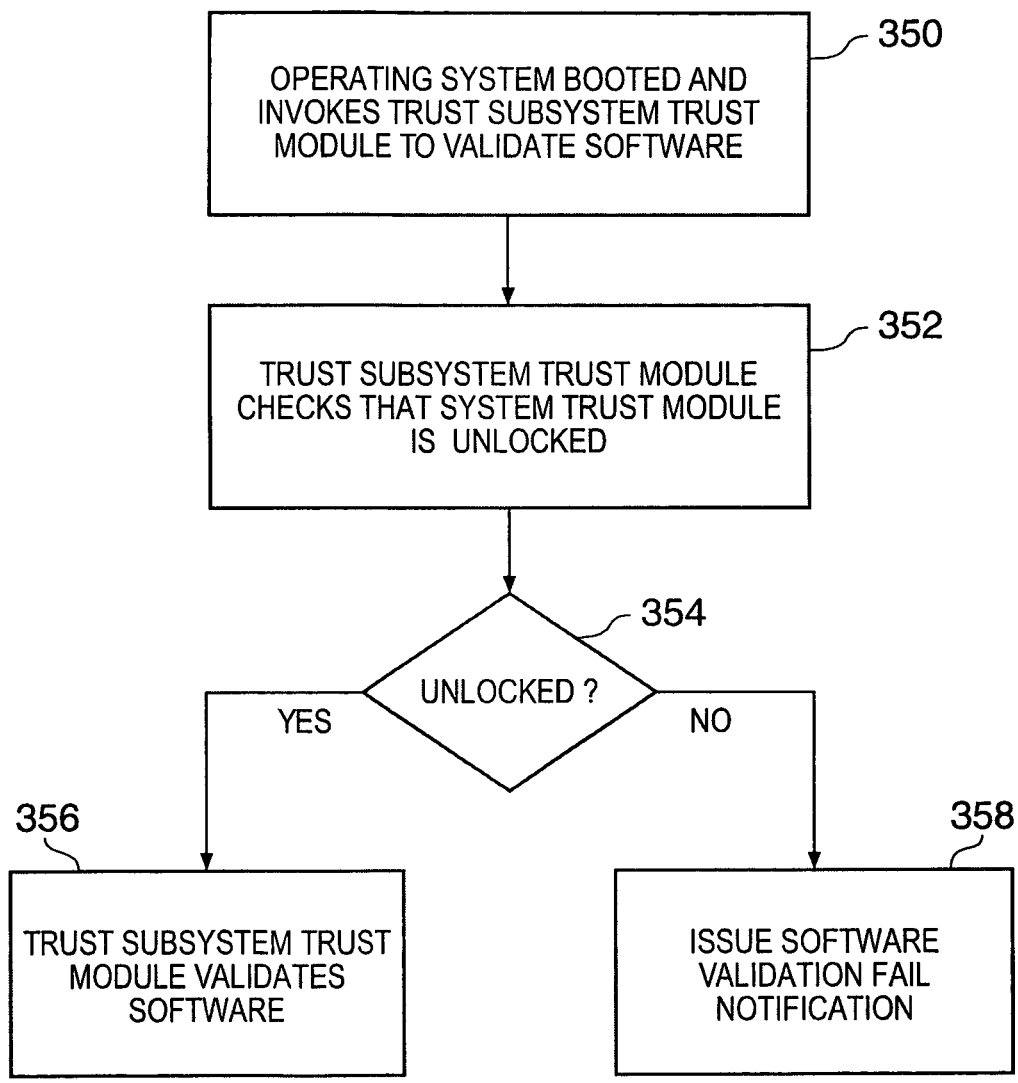
FIG. 12 illustrates further steps for testing the presence of a trust subsystem.

FIGS. 11-12 illustrate this first example of operation of a computer system 10 provided with a trust subsystem 300 as illustrated in FIG. 10. In this example of operation, the computer system is configured to provide self-test and self-validation based on the trust data held in the system trust module 20 and the trust subsystem 300.

FIG. 11 illustrates steps performed on initial power on of a computer system 10 as described above. In step 340, boot firmware invokes measures employing the system trust module 20. In step 342, the system trust module validates the firmware. If, in step 344, the validation is positive, then in step 346, the system trust module is unlocked. Alternatively, if the validation fails, then in step 348 the system trust module remains locked. In the process shown in FIG. 11, the results of the validation of the firmware performed by the system trust module is held in the system trust module. Accordingly, it can be seen that the system trust module 20 is responsible for the validation of the firmware, prior to starting the operating system, and that the results of the validation performed by the system trust module is held in the system trust module.

FIG. 12 illustrates the steps performed on booting of the operating system. In step 350, the operating system boots and invokes the trust subsystem trust module to validate software.

In step 352, a driver for the trust subsystem trust module 320 initially checks the system trust module is unlocked (i.e., the validation performed by the system trust module was positive and the system trust module was unlocked in step 346 of FIG. 11).

If it is determined in step 354 that the system trust module 20 is unlocked, then the trust subsystem trust module 320 assumes that the firmware is valid and then proceeds to invoke measures to validate the system software in step 356. Alternatively, if it is determined in step 354 that the system trust module is not unlocked, then in step 358, a software validation fail notification is issued by the driver.

Accordingly, it can be seen that the combination of steps shown in FIGS. 11 and 12 can provide complete verification of the firmware and software of the computer system, with the result of the verification of the firmware being held in the system test module 20 and the results of the verification of the software being held in the trust subsystem 300. In order to verify the correct operation of the firmware, as indicated in FIG. 12, the trust subsystem 300 merely needs to check that the system trust module is unlocked.

In the second example of operation, each software model involved in the boot process performs an integrity measure of the next software component that will take control of the system. The integrity measure is stored in a register of the trust module. Then, without any integrity checks, the trust module gives control to the next software module. This boot process is described as an attested boot. This model puts the burden of checking integrity measures against a reference value on components outside the system. For example, this could be provided by an integrity server.

Figure 13:
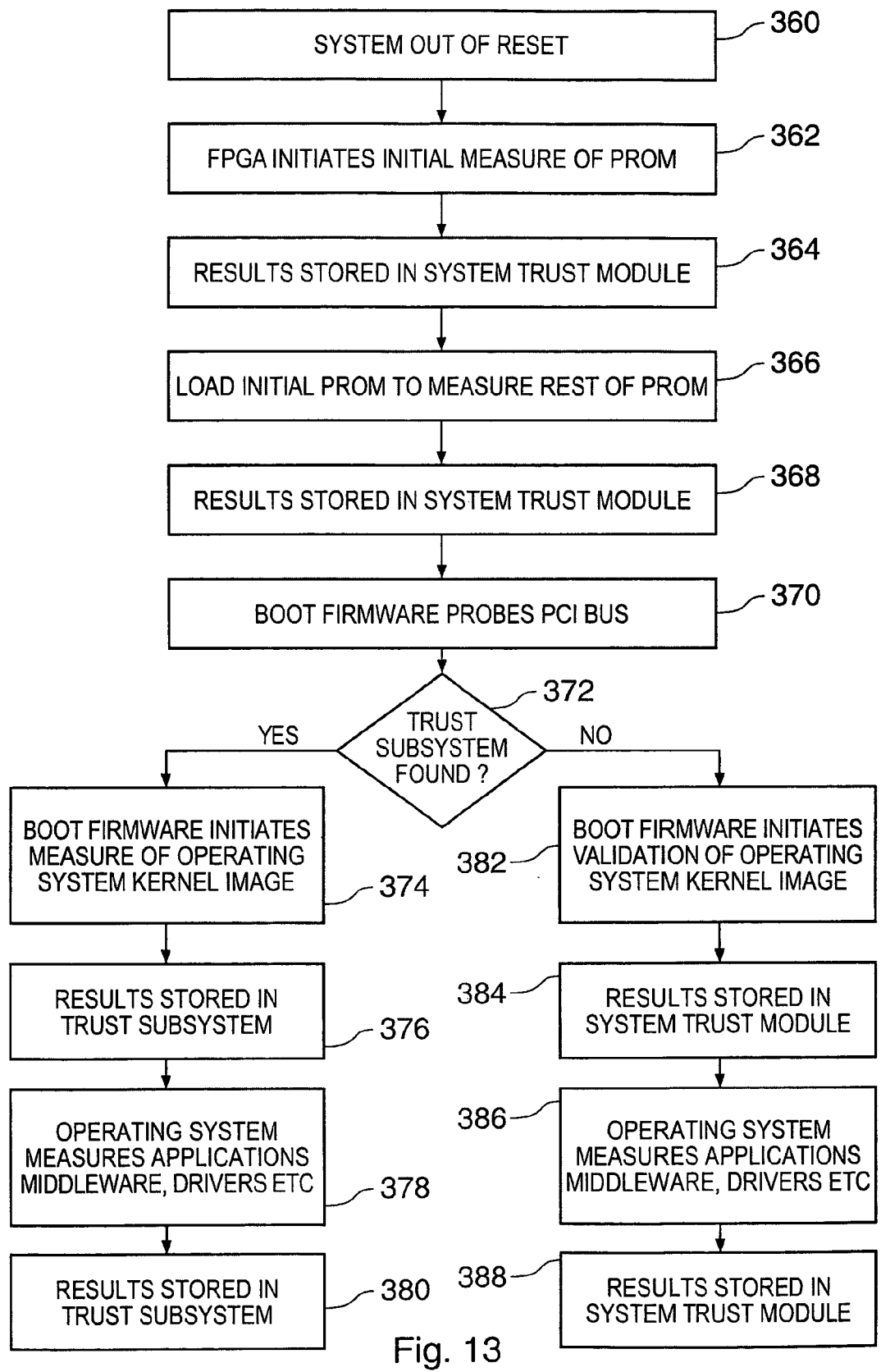
FIG. 13 sets out validation steps using a system trust module and a trust subsystem.
Figure 14:
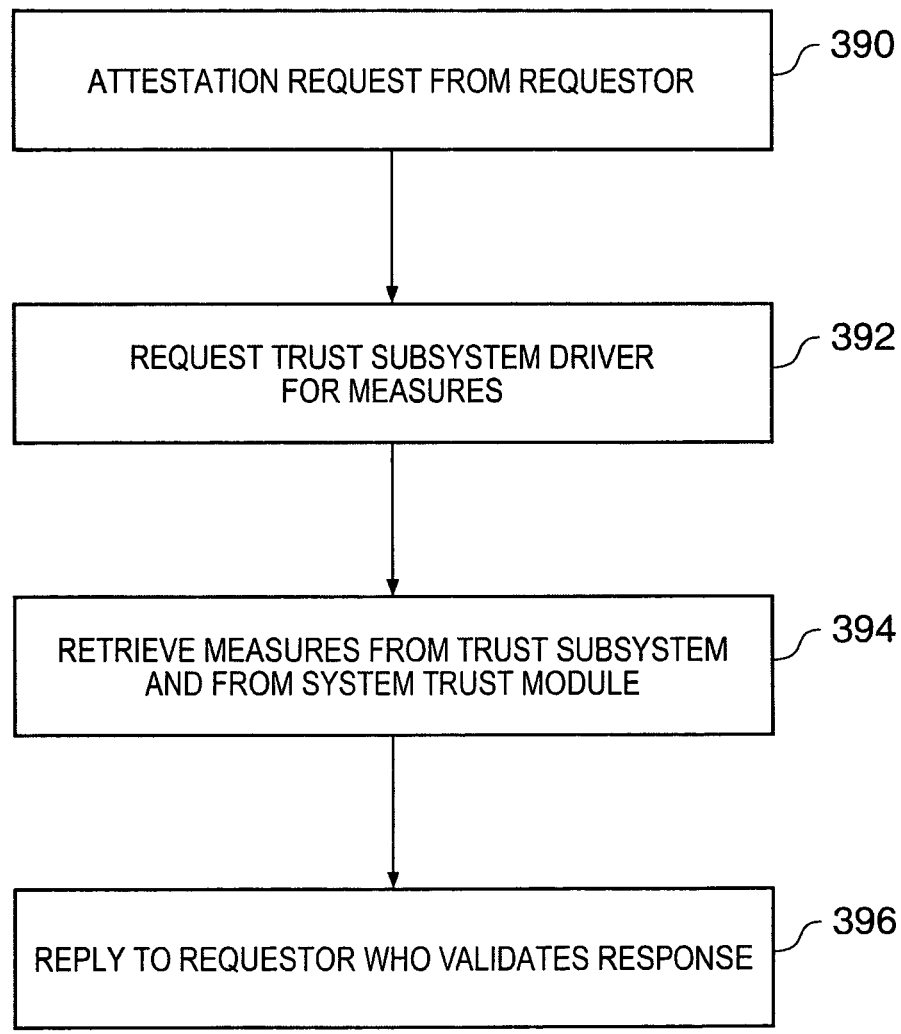
FIG. 14 illustrates an example of steps in a method for remote validation of trust measures.

FIGS. 13 and 14 illustrate this second example of operation, where the trust modules do not perform self tests, but rather the tests and attestations are provided remotely.

In FIG. 13, at step 360, the system comes out of reset. At step 362, the FPGA 16 initiates an initial measure of the PROM 24 and stores the results in the system trust module 20 in step 364. In step 366, the initial part of the PROM 24 is loaded to measure the rest of the PROM, and in step 368, the results are stored in the system trust module 20. In step 370, the boot firmware probes the PCI bus(es) for the presence of a trust subsystem 300. If, it is determined in step 372 that a trust subsystem is found, then in step 374, the boot firmware initiates a measure of an operating system kernel image and, in step 376, the results are stored in the trust subsystem 300. Then, in step 378, the operating system measures applications, middleware, drivers, etc, and the results are stored, in step 380, in the trust subsystem 300.

If, in step 372, a trust subsystem is not found, then in step 382, the boot firmware initiates validation of an operating system kernel image, and in step 384, the results are stored in the system trust module 20. Then, in step 386, the operating system measures applications, middleware, drivers, etc, and stores the results in step 388 in the system trust module.

FIG. 14 illustrates the steps of performing attestation based on a request from a requester using the data stored in a trust subsystem or a system trust module, as appropriate.

In step 370, an attestation request is received from a requester. The requester could be a remote system, a remote application, a controller, etc. In step 392, a trust subsystem driver is requested for measures to provide the requested attestation. In step 394, the measures are received from the trust subsystem 300 and where appropriate from the system trust module 20. In step 396, a reply is sent to the requester who validates the response.

It is to be noted that storing and verifying software measures are one-time tasks in a system boot and are not in themselves performance critical. If all hashes were done in the trust module 20, then this could have a significant impact on the time to boot. However, in fact it is only the first hash of the first 1 kB of boot firmware needs to be done in the trust module 20 (invoked by the FPGA 16). After that the code running on the processor 12 carries out the hashes of the next code to be measured and just gives the result to the trust module 20 before loading that code.

The potential performance issue that the present example embodiment addresses is caused by the fact that all data exported from the trust module(s) is encrypted. As a result, when the trust module receives an attestation request for current software stack measures, it is also given the public key from the requestor. The trust module concerned has to gather up the measures and encrypt them all using normal asymmetric encryption methods before exporting them out of the device, and this is computationally intensive. If a high performance device 315 has access to all the measures and the trust module's private and public keys, it can receive the request and produce the encrypted data much faster.

Figures 15, 16:
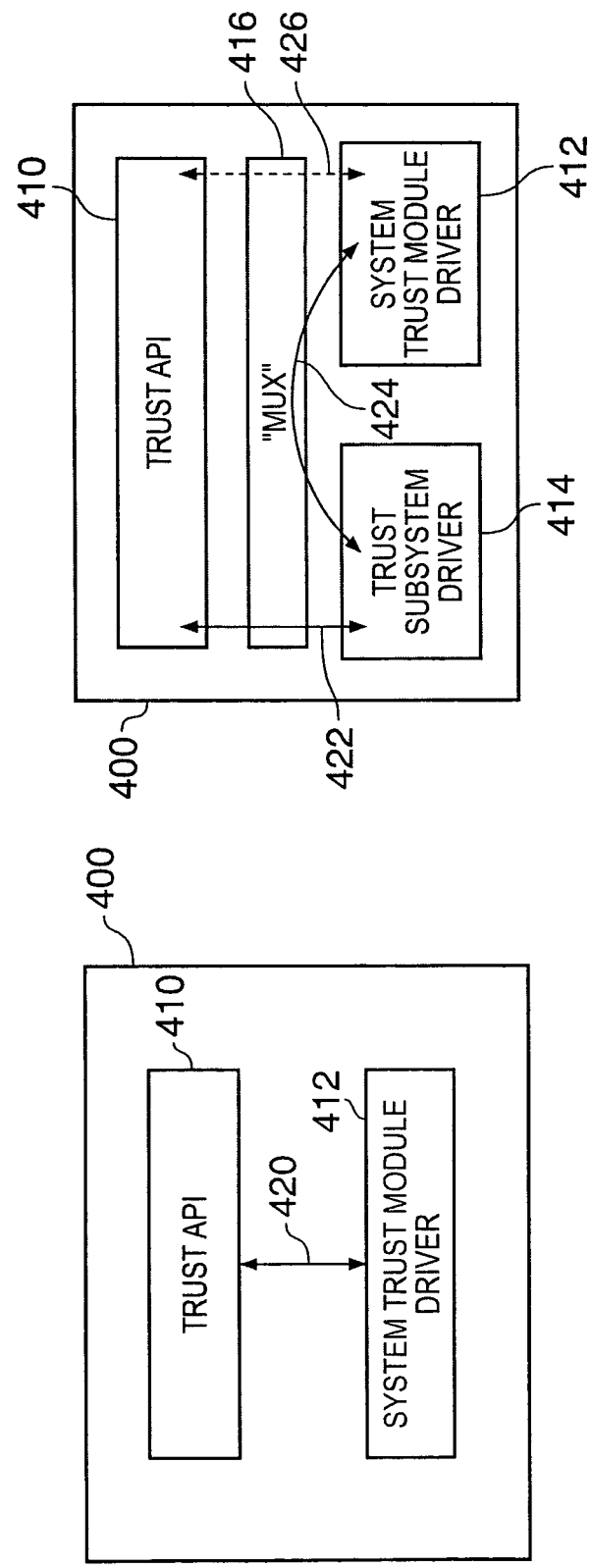
FIG. 15 illustrates components of an operating system in which a system trust module is employed.
FIG. 16 illustrates components of an operating system in which a trust subsystem and a system trust module are employed.

Reference is made in FIG. 14 to a trust subsystem driver. FIG. 15 illustrates components of an operating system 400 including a trust application program interface 410 which can make reference via a link 420 to a system trust module driver 412 for a system trust module 20, where no trust subsystem 300 is provided. In this situation, the trust API 410 interfaces directly via the link 420 with the system trust module driver 412 for calling the system trust module 20.

FIG. 16 illustrates the relationship between a trust subsystem driver 414 and a system trust module driver 412 in a system where a trust subsystem 300 is provided as well as a system trust module 20. In this situation, the trust API 410 provides a link 422 to the trust subsystem driver 414 via a multiplex function 416. The trust subsystem driver 414 then provides a link to the system trust module driver 412. Accordingly, the trust API 410 normally converses with the trust subsystem driver 414 that in turn converses with the system trust module driver 412. There can, however, be a secondary link 426 directly between the trust API and the system trust module driver 412 for administrative functions relating to that device.

The driver configuration illustrated in FIG. 16 provides a mechanism whereby, in the first example of operation, the subsystem trust module can determine whether the system trust module verified the platform specific firmware as valid and, where the system trust module verified the platform specific firmware as valid, the subsystem trust module can then subsequently be operable to verify software provisioned on the computer system.

The driver configuration illustrated in FIG. 16 also provides a mechanism whereby, in the second example of operation, the subsystem trust module can be responsive to external attestation requests, and to respond to the attestation requests based on software measures held by the trust subsystem and based on firmware measures held by the system trust module.

In the event of a system failure in a computer system that comprises a system trust module 20 and a trust subsystem 300, it is possible efficiently to port all of the trust data from a failed system to a replacement system without manually having to reconstruct the trust state of the failed system into the replacement system. The process described with reference to FIGS. 7-9 can be employed for the porting of the trust data from a system trust module 20 using a system configuration card or other removable storage medium to the replacement system. In the case of the trust status held in the trust subsystem, where this is configured as a component card, such as a PCI card, this can readily be transferred to the replacement system by removing the component card from the failed system and inserting the component card into the replacement system.

If the trust subsystem 300 were fixed to the motherboard, or other configured in a non-removable manner, then data portability could still be achieved by extending the removable storage medium (in the present case the system configuration card) functionality to both trusted modules 20 and 320, by providing two storage areas on the removable storage medium.

There has been described, a trust subsystem for a computer system that comprises a system trust module operable to take measurements for platform specific firmware during a system boot, the trust subsystem comprising a subsystem trust module in communication with the system trust module and operable to take measurements for software provisioned on the computer system. Thus, relatively low performance integrated trust module 20 is used to take measurements of firmware prior to starting of an operating system on the computer system and a relatively high performance trust subsystem which can be used to take measurements of software measures following the initiation of the operating system. In the case that the trust subsystem 300 is absent, the trust module 20 can be used to take the measurements of firmware and software within the computer system.

Two modes of validating integrity have been described. The first is where a system trust module is programmed by the correct measurements by a system administrator (who invokes a command which tells the trust module that the current measures are those which should always be found) and the system trust module simply compares the measures as it gets them against the expected values. If the compare succeeds, the system trust module remains unlocked. If the compare fails the system trust module becomes locked until a next system reset or an administrator resets the system trust module. In the second mode, no expected values are programmed into the system trust module. The software measures are passed to the system trust module before that bit of code is loaded as before, but are now just available to be interrogated by a remote entity wanting to check the system integrity. Where a trust subsystem is also provided, a trust subsystem driver checks whether the system trust module is unlocked and if the trust subsystem is configured to validate software measures. The driver will report a measure failure and lock the subsystem if this fails.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of enabling the porting of trust data secured in a trust module of a computer system using a manufacturer key, the method comprising:
   a) extracting the trust data from the trust module using the manufacturer key;
   b) storing the trust data and the manufacturer key, encrypted with a control key, on a removable storage medium, wherein the control key and the manufacturer key are preprogrammed into the system controller; and
   c) monitoring for changes to the trust data in the trust module and, in response to detecting a change in the trust data, repeating steps (a), (b), and (c).

2. The method of claim 1, wherein, in step (a), a system controller of the computer system extracts the trust data from the trust module using the manufacturer key and, in step (b), the system controller stores the trust data and the manufacturer key encrypted with the control key on the removable storage medium.

3. The method of claim 2, wherein step (c) comprises a bus controller monitoring for access to a bus to which the trust module is connected.

4. The method of claim 3, wherein the bus controller is operable to inform the system controller on detecting trust module access via the bus, and subsequently, the system controller is operable to request the bus controller for access to the trust module via the bus prior to access to the trust module.

5. The method of claim 1, wherein an initially preprogrammed control key is user replaceable.

6. The method of claim 1, wherein step (c) comprises monitoring for changes to the trust data in the trust module when the computer system is reset.

7. The method of claim 1, wherein the removable storage medium is a system configuration card.

8. The method of claim 1, further comprising:
   d) removing the removable storage medium from the computer system and providing the removable storage medium to a replacement computer system;
   e) the replacement computer system, which is preprogrammed with the control key, extracting the trust data and the manufacturer key from the removable storage medium using the control key; and
   f) programming a trust module of the replacement computer system using the trust data encrypted using the manufacturer key.

9. The method of claim 8, wherein, in step (e) a system controller of the replacement computer system extracts the trust data and the manufacturer key from the removable storage medium trust module unit using the control key and, in step (f) the system controller programs the trust module of the replacement computer system using the trust data encrypted using the manufacturer key.

10. The method of claim 1, wherein step (c) comprises monitoring for changes to the trust data in the trust module when the computer system is powered off.

11. A computer system, comprising:
   a trust module, in which trust data is secured using a manufacturer key;
   a system controller coupled to the trust module, wherein the system controller is operable to:
      extract the trust data from the trust module using the manufacturer key;
      store the trust data and the manufacturer key, encrypted with a control key, on a removable storage medium, wherein system controller is preprogrammed with the control key and the manufacturer key;
   wherein the computer system is operable to:
      monitor the trust module for changes to the trust data; and
      in response to detecting a change in the trust data, repeat said extracting of the trust data from the trust module using the manufacturer key, said storing of the trust data and the manufacturer key, encrypted with a control key, on the removable storage medium, and said monitoring of the trust module for changes to the trust data.

12. The computer system of claim 11, wherein the preprogrammed control key is user replaceable.

13. The computer system of claim 11, wherein the system controller is operable to monitor for changes to the trust data when the computer system is reset.

14. The computer system of claim 11, wherein the trust module is connected to a bus controlled by a bus controller, and wherein the bus controller is operable to monitor for access to the trust module via the bus.

15. The computer system of claim 14, wherein the bus controller is operable to inform the system controller on detecting trust module access via the bus, and subsequent thereto, the system controller is operable to request the bus controller for access to the trust module via the bus prior to access to the trust module.

16. The computer system of claim 11, wherein the removable storage medium is a system configuration card.

17. The computer system of claim 11, wherein the system controller is operable to monitor for changes to the trust data when the computer system is powered off.

18. A method of enabling the porting of trust data secured in a trust module of a computer system using a manufacturer key, the method comprising:
   a) extracting the trust data from the trust module using the manufacturer key, wherein, in step (a), a system controller of the computer system extracts the trust data from the trust module using the manufacturer key;
   b) storing the trust data and the manufacturer key, encrypted with a control key, on a removable storage medium, wherein in step (b), the system controller stores the trust data and the manufacturer key encrypted with a control key on the removable storage medium; and
   c) monitoring for changes to the trust data in the trust module, wherein step (c) comprises a bus controller monitoring for access to a bus to which the trust module is connected; and
   d) in response to detecting a change in the trust data, repeating steps (a), (b), and (c).

19. The method of claim 18, wherein the bus controller is operable to inform the system controller on detecting trust module access via the bus, and subsequently, the system controller is operable to request the bus controller for access to the trust module via the bus prior to access to the trust module.

20. A method of enabling the porting of trust data secured in a trust module of a computer system using a manufacturer key, the method comprising:
   a) extracting the trust data from the trust module using the manufacturer key;
   b) storing the trust data and the manufacturer key, encrypted with a control key, on a removable storage medium; and
   c) monitoring for changes to the trust data in the trust module and, in response to detecting a change in the trust data, repeating steps (a), (b), and (c);
   d) removing the removable storage medium from the computer system and providing the removable storage medium to a replacement computer system;
   e) the replacement computer system, which is preprogrammed with the control key, extracting the trust data and the manufacturer key from the removable storage medium using the control key; and
   f) programming a trust module of the replacement computer system using the trust data encrypted using the manufacturer key.

21. The method of claim 20, wherein, in step (e) a system controller of the replacement computer system extracts the trust data and the manufacturer key from the removable storage medium trust module unit using the control key and, in step (f) the system controller programs the trust module of the replacement computer system using the trust data encrypted using the manufacturer key.

22. A computer system, comprising:
   a trust module, in which trust data is secured using a manufacturer key;
   a bus coupled to the trust module;
   a bus controller operable to:
      control the bus; and
      monitor for access to the trust module via the bus;
   a system controller coupled to the trust module, wherein the system controller is operable to:
      extract the trust data from the trust module using the manufacturer key;
      store the trust data and the manufacturer key, encrypted with a control key, on a removable storage medium;
   wherein the computer system is operable to:
      monitor the trust module for changes to the trust data; and
      in response to detecting a change in the trust data, repeat said extracting of the trust data from the trust module using the manufacturer key, said storing of the trust data and the manufacturer key, encrypted with a control key, on the removable storage medium, and said monitoring of the trust module for changes to the trust data;
   wherein the bus controller is further operable to inform the system controller on detecting trust module access via the bus, and subsequent thereto, the system controller is operable to request the bus controller for access to the trust module via the bus prior to access to the trust module.

\* \* \* \* \*